(12) United States Patent
Jetzek et al.

(10) Patent No.: US 6,539,227 B1
(45) Date of Patent: Mar. 25, 2003

(54) METHODS AND SYSTEMS FOR CONTROLLING HARD AND SOFT HANDOFFS IN RADIO COMMUNICATIONS SYSTEMS

(75) Inventors: Ulrich Jetzek, Nürnberg (DE); Petter Blomberg, Sundyberg (SE); Lars B. Johansson, Linköping (SE); Sture Jonsson, Lúlea (SE); Peter Butovitsch, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/461,030

(22) Filed: Dec. 15, 1999

(30) Foreign Application Priority Data

Dec. 18, 1998 (WO) ................ PCT/IB98/02076

(51) Int. Cl.⁷ ................................ H04Q 7/20
(52) U.S. Cl. .................. 455/442; 455/437; 455/438; 455/440; 370/331; 370/332
(58) Field of Search .................. 455/436, 440, 455/442, 443, 444, 447, 437, 438, 439, 441, 450, 509; 370/310.2, 331, 332, 333, 334

(56) References Cited

U.S. PATENT DOCUMENTS

| | | | |
|---|---|---|---|
| 5,239,667 A | | 8/1993 | Kanai |
| 5,379,446 A | | 1/1995 | Murase |
| 5,625,876 A | * | 4/1997 | Gilhousen et al. ........ 370/331 |
| 5,649,292 A | * | 7/1997 | Doner ..................... 455/447 |
| 5,678,185 A | | 10/1997 | Chia |
| 5,701,585 A | | 12/1997 | Kallin et al. |
| 5,722,072 A | | 2/1998 | Crichton et al. |
| 5,722,073 A | | 2/1998 | Wallstedt et al. |
| 5,774,809 A | | 6/1998 | Tuutijarvi et al. |
| 5,940,761 A | * | 8/1999 | Tiedemann, Jr. et al. ... 455/437 |
| 5,999,522 A | * | 12/1999 | Rohani ..................... 370/331 |
| 6,078,817 A | * | 6/2000 | Rahman .................... 455/452 |
| 6,122,513 A | * | 9/2000 | Bassirat ................... 455/443 |
| 6,151,512 A | * | 11/2000 | Chheda et al. ............. 455/562 |
| 6,215,982 B1 | * | 4/2001 | Trompower ................. 455/63 |
| 6,216,004 B1 | * | 4/2001 | Tiedemann, Jr. et al. ... 455/442 |
| 6,266,529 B1 | * | 7/2001 | Chheda ..................... 455/436 |
| 6,320,898 B1 | * | 11/2001 | Newson et al. ............ 375/144 |
| 6,321,090 B1 | * | 11/2001 | Soliman .................... 455/440 |

FOREIGN PATENT DOCUMENTS

| | | |
|---|---|---|
| EP | 0 631 451 A2 | 12/1994 |
| EP | 0 685 974 A1 | 12/1995 |
| EP | 0 817 517 A1 | 1/1998 |
| WO | WO 96/02117 | 1/1996 |
| WO | WO 96/31078 | 10/1996 |

OTHER PUBLICATIONS

International Search Report *Date of Completion*: May 26, 2000; *Date of Mailing*: Jun. 7, 2000.

* cited by examiner

*Primary Examiner*—Edward F. Urban
*Assistant Examiner*—Temica M. Davis (57) ABSTRACT

A method and system for controlling handoffs in radiocommunication systems using a softzone concept are described. Soft handoff is permitted between members of a particular softzone, but not between members of different softzones. Hard handoff is permitted between members of different softzones, but not between members of the same softzone.

38 Claims, 5 Drawing Sheets

METHODS AND SYSTEMS FOR CONTROLLING HARD AND SOFT HANDOFFS IN RADIO COMMUNICATIONS SYSTEMS

This application claims priority under 35 U.S.C. §§119 and/or 365 to PCT/IB98/02076 filed in WIPO on Dec. 18, 1998; the entire content of which is hereby incorporated by reference.

BACKGROUND

The present invention relates generally to methods and systems for radiocommunications and, more particularly, to such systems in which a connection can be handed over from one channel or base station to another.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

In cellular systems, the capability is typically provided to transfer handling of a connection between, for example, a mobile station and a base station to another base station, as the mobile station changes its position and so moves out of the coverage area of one base station and into the coverage area of another base station. This type of handoff is commonly referred to as an "intercell" handoff as the coverage areas associated with base stations are commonly referred to as "cells". Depending upon the quality of the current channel, it may also be desirable to transfer a connection from one channel of the base station to another channel supported by the same base station, which handoffs are commonly referred to as "intracell" handoffs.

Figure 1A:
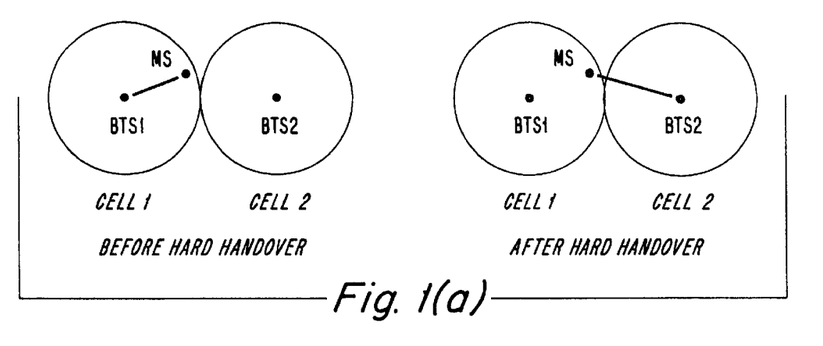

So-called "hard" handoffs refer to handoffs which are performed wherein there is no overlap in time between transmissions received from an original, serving base station and transmissions received from a new, target base station. As shown in FIG. 1(a), during hard handoff, the mobile station (MS) typically first breaks its connection to its original base station (BTS1) and then establishes a connection to its new base station (BTS2).

Figure 1B:
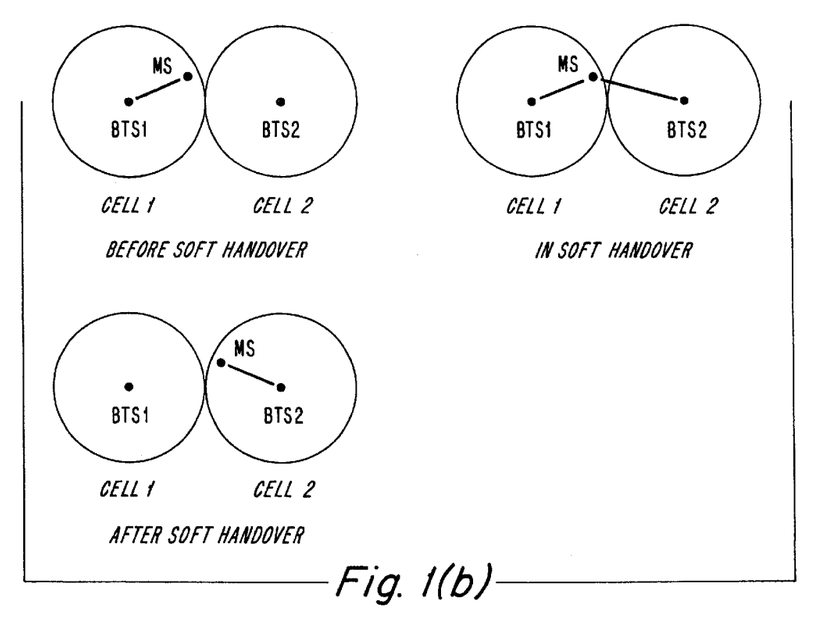

By way of contrast, "soft" handoffs refer to handoffs wherein, for some period of time, a mobile station receives substantially the same information from two (or more) transmission sources. An exemplary soft handoff scenario is illustrated in FIG. 1(b). Therein, before starting soft handoff, the MS is connected to BTS1. During the soft handoff, the MS establishes a connection to BTS2 without dropping the connection to BTS1. Each base station which is concurrently communicating with a particular mobile station may be referred to as a member of that mobile station's "active set". At some time after the connection to BTS2 is set up, the connection to BTS1 will be released which is the termination of the soft handover procedure. The overlapping transmissions from BTS1 and BTS2 permit the mobile station to smoothly switch from receiving information from its original, serving base station to receiving information from its new, target base station. During soft handoff, the mobile station may also take advantage of the fact that it is receiving substantially the same information from two sources to improve its received signal quality by performing diversity selection/combining of the two received signals.

Figure 2:
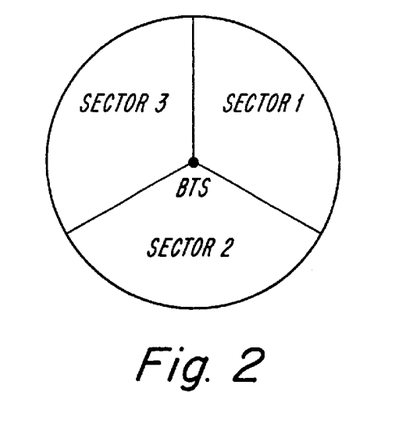
FIG. 2 depicts a base station employing sector antennas.
Figure 3:
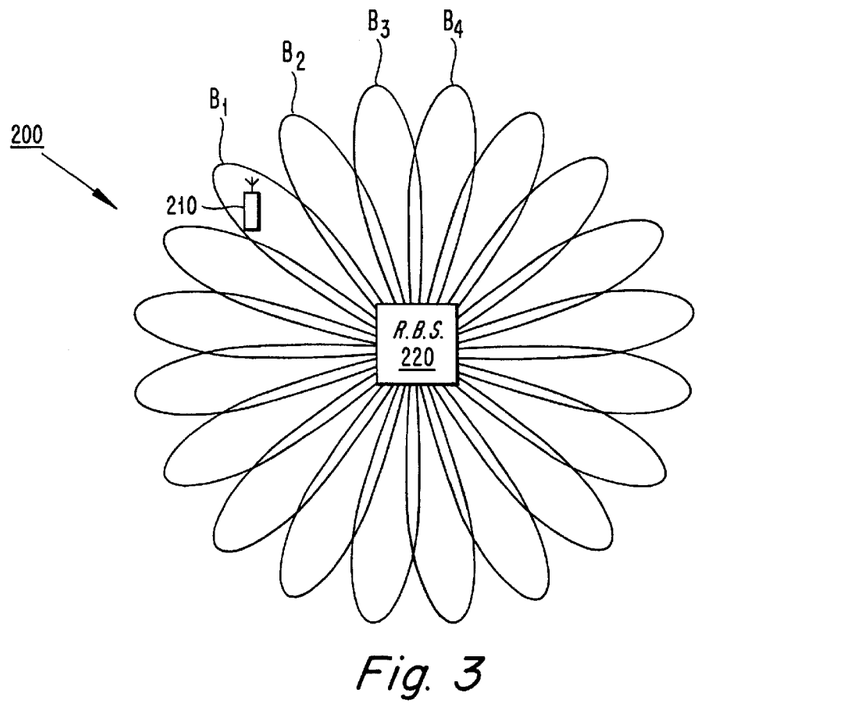
FIG. 3 shows a base station employing an array antenna.

For the sake of simplicity, the foregoing examples of the hard and soft handoff were described in the context of base stations employing omnidirectional antennas, i.e., wherein each base station transmits signals which propagate in a substantially circular direction, i.e., 360 degrees. However, as will be appreciated by those skilled in the art, other antenna structures and transmission techniques may also be employed in radiocommunication systems. For example, a cell can be subdivided into several sectors, e.g., into three sectors where each sector covers a 120 degree angle as shown in FIG. 2. Alternatively, the system or cell may employ an array antenna structure as shown in FIG. 3. Therein, an exemplary radio communication system 200 includes a radio base station 220 employing a fixed-beam phased array (not shown). The phased array generates a plurality of fixed narrow beams ($B_1$, $B_2$, $B_3$, $B_4$, etc.) which radially extend from the base station 220, at least one of which ($B_1$) is used to communicate with MS 210. Preferably, the beams overlap to create a contiguous coverage area to service a radio communication cell. Although not shown, the phased array can actually consist of three phased array sector antennas.

Of course, the principles described above with respect to hard and soft handoff for omnidirectional antennas in FIGS. 1(a) and 1(b) can be directly mapped to other systems which employ sectorized and/or array antennas. In these latter types of systems, hard and soft handoffs can be performed between sectors or beams of the same base station as well as between sectors or beams associated with different base stations.

Both types of handoff have their drawbacks and advantages. On the one hand, soft handoff provides a robust mechanism for changing the connection from one base station to another. However, since the mobile station is connected to more than one base station during soft handoff, soft handoff requires more system resources than hard handoff. An advantage of hard handoff, therefore, is a reduced need for system resources, while its drawback is a higher probability of dropped calls when compared to soft handoff.

Figure 4:
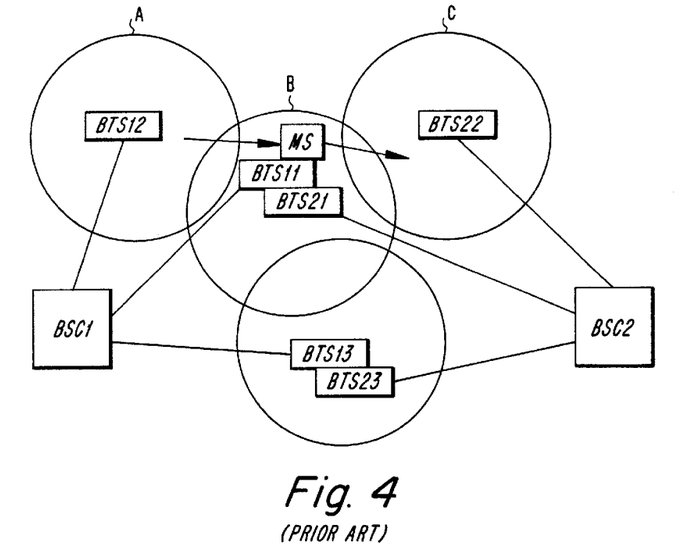
FIG. 4 is an illustration of a conventional technique for performing sequential hard and soft handoffs to handoff a connection involving two base station controllers.

Both hard and soft handoffs are employed in some radiocommunication systems. For example, FIG. 4 illustrates a system described in WO 96/02117, wherein soft and hard handoff are applied sequentially. Therein, a system containing two base station controllers, BSC1 and BSC2, is shown. BSC1 controls base stations BTS11, BTS12 and BTS13, while BSC2 controls base stations BTS21, BTS22, and BTS23. The area that is served by all of the base stations coupled to a BSC is called a "BSC area".

Assume for this example, that the mobile station (MS) moves from cell A served by the base station BTS12 to cell B, which is at the border between two BSC areas. Cell B is served by two overlapping base stations, BTS11 and BTS21. BTS11 is coupled to controller BSC1, and BTS21 is coupled to base station controller BSC2. As the MS moves to cell B, it carries out a soft handoff controlled by BSC1 to a traffic channel of base station BTS11.

Assume further that the MS continues onward toward cell C and finally enters into its area of radiocommunication coverage. The base station BTS22, serving cell C, is under the control of BSC2. Before it is possible to activate the base station BTS22 for the handoff, the call control must first be switched to base station controller BSC2 from the previous controller BSC1. This is accomplished by performing a hard handoff. The MS performs a hard handoff from the base station BTS11 to the base station BTS21, and consequently, the base station controller change from BSC1 to BSC2 takes place. Finally, a soft handoff from BTS21 to BTS22 is performed.

However, these techniques described in WO 96/02117 do not provide a mechanism for controlling the use of either soft or hard handoff. Instead, these techniques are simply provided as an intended mechanism for reducing interference and signaling overhead associated with the handoff of a mobile area from a service area under the control of a first BSC to a service area under the control of a second BSC. Thus, these techniques do not provide any solution for controlling the usage of soft and hard handoff between cells per se.

Figure 5:
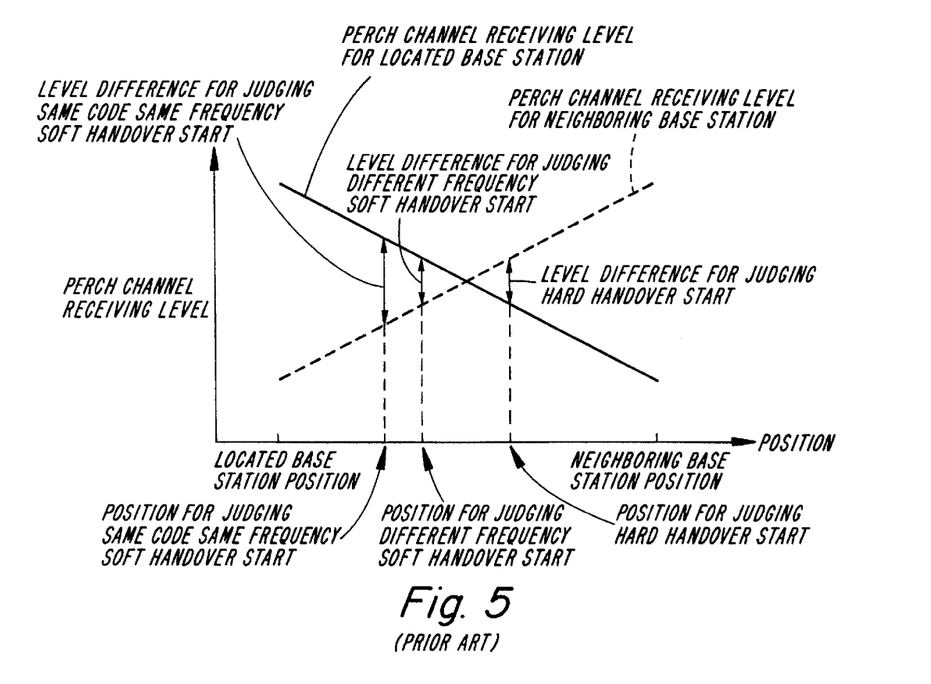
FIG. 5 depicts another conventional technique for controlling different types of handoff.

According to European Patent Application 817 517 A1, as illustrated in FIG. 5, a technique is presented for determining an appropriate type of handoff for a mobile station. In the Figure, the received perch channel (i.e., a type of broadcast control channel) level is shown for the cell where the MS resides initially (solid line) as well as for a neighboring cell (dashed line). The received levels are given with respect to the position of the mobile station.

According to EP 817 517 A1, the handoff type judgement method for a CDMA mobile communication system provides different types of handoff with different handoff start conditions. A type of handoff for which a handoff start condition is weakest, among the available types of handoff at a mobile station, is evaluated first. It is determined whether the handoff start condition for this type of handoff is satisfied or not at the mobile station. Each base station is notified for carrying out that type of handoff when the handoff start condition for that handoff is satisfied.

However, the techniques described in EP 817 517 A1 require that the mobile station be informed for each sector regarding which type of handoff is available. Hence out of a number of possible cells/sectors suitable for handoff with, possibly, different available handoff types, the mobile station first has to select all cells/sectors that are available for the handoff type with weakest start condition. In a second step, a judgement among all of these cells/sectors will be performed. Thus, these techniques suffer from the drawbacks of having a two step procedure that requires intense signalling between the network (i.e., the base station) and the mobile station and that it is also quite complex to implement.

Accordingly, there is a need to develop enhanced techniques to determine when a handoff is appropriate, and which type of handoff is appropriate, to efficiently utilize system resources under different operating conditions.

SUMMARY

These, and other, problems, drawbacks, and limitations of conventional handoff techniques, are overcome according to the present invention in which a mechanism is provided for controlling the usage of soft and hard handoffs. According to exemplary embodiments of the present invention, methods and systems determine which handoff type is preferred at a specific location under current radio conditions. Another object of the present invention is to control hard and soft handoff while at the same time minimizing the overhead signalling between the network and the mobile station. Yet another object is to provide control methods and systems which are applicable to radiocommunication systems that use more than one frequency band to support communications in a cell/sector at the same time.

These, and other objects of the present invention are attained by grouping transmission sources (e.g., cells, sectors, base stations, beams or combinations thereof) into softzones. Each softzone has its own softzone identity. Softzone identities can be reused for sectors which are not too close to each other. All members in the active set have the same softzone identity. However, each transmission source may belong to multiple softzones. Soft handoffs may only be performed with transmission sources having the same softzone id as current members of the active set. Likewise, hard handoffs may only be performed to transmission sources having a different softzone id than current members of the active set.

Softzone handoff mechanisms according to the present invention provide a number of benefits. For example, the overhead signalling between the mobile station and the network associated with controlling handoff type selection will be reduced as compared, for example, to the techniques described in EP 817 517 A1. This is due to the fact that cells/sectors are grouped into different softzones instead of treating each cell/sector separately for the purpose of determining which type of handoff, if any, is appropriate. Moreover, these techniques provide a one-step procedure which permits great flexibility in the number of different handoff types that can be used.

Cell planners can use the softzone concepts described herein as a tool to take into account that between certain cells hard handoff might be more reasonable while between other cells a soft handover might be most suitable. Moreover, the grouping of transmission sources into particular softzones need not be static, e.g., a network operator may adjust softzone assignments based on changes to system structure (e.g., cell addition or cell splitting), changing load conditions, etc. Softzones can also be automatically regrouped by way of a dynamic regrouping algorithm, e.g., based on current network resources, air interface resources and loading patterns.

BRIEF DESCRIPTION OF THE DRAWINGS

The foregoing, and other, objects, features and advantages of the present invention will be more readily understood upon reading the following detailed description in conjunction with the drawings in which:

FIG. 1(*a*) is an illustration of hard handoff;

FIG. 1(*b*) is an illustration of soft handoff;

DETAILED DESCRIPTION

In the following description, for purposes of explanation and not limitation, specific details are set forth, such as particular circuits, circuit components, techniques, etc. in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary details. For example, although not described in detail herein, the present invention is applicable to radiocommunication systems which employ any type of access methodology, e.g., Frequency Division Multiple Access (FDMA), Time Division Multiple Access (TDMA), Code Division Multiple Access (CDMA), or any hybrid thereof.

Moreover, this specification describes techniques that are applicable to different types of handoffs. However, these techniques can be applied to handoffs from or to any transmission source, e.g., a cell, a base station, a sector, a beam, a transceiver, etc. Accordingly, although the term "cell" is used primarily herein to illustrate how handoff mechanisms according to the present invention operate, it will be appreciated by those skilled in the art that these techniques apply equally to any type of transmission source.

Figure 6:
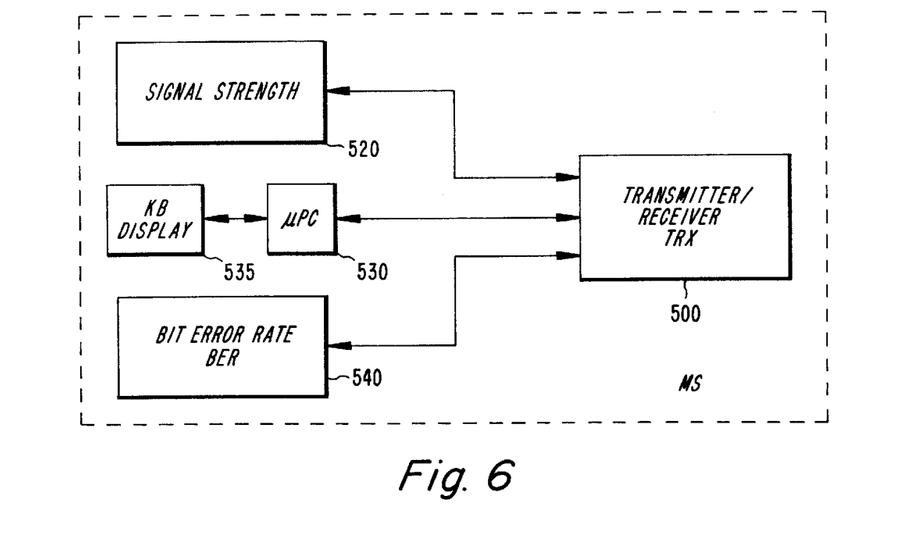
FIG. 6 is a block diagram showing various functional blocks of an exemplary mobile station.

Prior to describing the details of the present invention, an example of the construction of a mobile station which can operate to perform the signal quality measurements described above is illustrated in FIG. 6. This block diagram has been simplified to illustrate only those components relevant to the measurement of downlink signal strength, however those skilled in the art will be well aware of the other major functional blocks associated with mobile stations. In FIG. 6, incoming radio signals are received by transmitter/receiver TRX 500. The timing is synchronized to the received symbol sequence by microprocessor controller 530. The strength of the received signals are measured by a signal strength measuring part 520, the value of which is then passed to microprocessor controller 530. The bit error rate (BER) of the received signal can also be determined as an indication of received signal quality as reflected by block 540. This measurement of received signal quality is particularly relevant in determining when an intracell handoff is desirable. Of course, the present invention is applicable to systems which use any type of quality measurement parameter, e.g., signal-to-interference ratio, received signal strength or pathloss. The mobile station will also have input/output devices, such as a keyboard and display 535, as well as a microphone and speaker unit (not shown), which enables information to be exchanged between the mobile station and the base station.

When the mobile station receives a list of channel numbers, codes or other channel identifying information in a measurement command, it will measure the received signal quality associated with each of those channels. Once the mobile station has made the requested measurements, at least two different evaluation techniques can be employed. First, if network evaluated handoff (NEHO) is employed, then the mobile station will report the measurements to the system which will then evaluate the various sectors using a handoff algorithm. Alternatively, if mobile evaluated handover (MEHO) is employed, then the mobile station itself will evaluate the various sectors.

Figure 7:
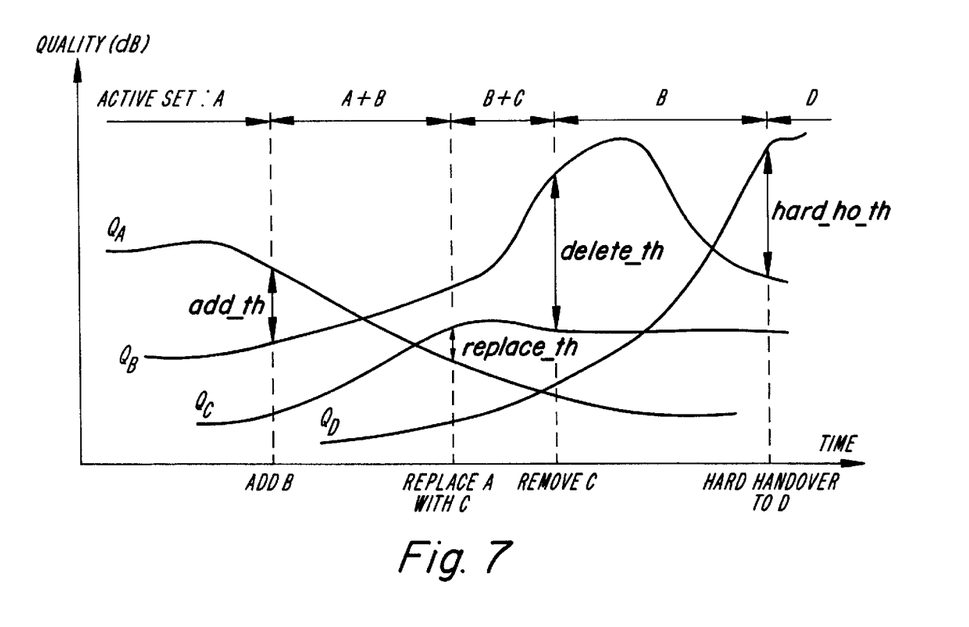
FIG. 7 is a graph illustrating various handoff algorithm conditions for adding, deleting and replacing sectors.

An example is provided in FIG. 7 to illustrate how the active set may change over time based on applying a handoff algorithm to these measurements. Taking as a given that there are four sectors (A,B,C,D) of interest in the handoff scenario of FIG. 7, it is initially assumed that only sector A belongs to the active set. The measurement set in this example contains all sectors of the active set and all the neighbors of the active set, in this example A, B and C. Generally speaking, the measurement set contains all of the transmission sources for which the mobile station makes measurements. The measurement set typically includes all members of the active set, as well as transmission sources which are neighbors of the transmission sources in the active set. The measurement set is also typically defined by the network and periodically transmitted to the mobile station.

This exemplary handoff algorithm dictates that different handoff actions will be triggered according to the conditions stated below:

1. Add a sector: A sector X is added to the current active set if its quality $Q_x$ meets the following condition:

$$Q_x > Q_{best} - \text{add\_th}$$

where $Q_{best}$ represents the quality of the sector with the best quality in the Active Set and add_th is a threshold value. For example, as shown in FIG. 7, sector B is added to the active set at the time instant marked 'Add B' since the difference between its quality level and the quality level received from sector A falls below add_th. Note that after time 'Add B', sector D is added to the measurement set because it is a neighbor to sector B.

2. Delete a sector: A sector X is deleted from the current active set if its quality $Q_x$ meets the following condition:

$$Q_x < Q_{best} - \text{delete\_th}$$

where delete_th represents the deletion threshold. An example of this condition occurring may be found at time instant marked 'Remove C' in FIG. 7, wherein sector C is removed from the active set since the difference between its received quality level and that of sector B exceeds delete_th.

3. Replace a sector: The maximum number of cells allowed in the active set is limited. Once this maximum number is reached, the active set is said to be full. A sector X replaces the sector with the worst quality in the active set if the active set is full and the following condition holds:

$$Q_x > Q_{worst} + \text{replace\_th}$$

where replace_th represents the threshold used for sector replacement. Provided that the maximum number of sectors in the active set is two in FIG. 7, sector C should replace sector A at time instant marked 'Replace A with C' in FIG. 7.

4. Perform a hard handover: A hard handover from the current active set to a new sector is carried out if the quality $Q_x$ of sector X fulfills the following condition:

$$Q_x > Q_{best} + \text{hho\_th}$$

where hho_th represents the threshold used for hard handover, i.e., all connections of the current active set will be removed and a new connection to sector X will be set up. This is, for example, the case at the time instant marked 'hard handover to D' in FIG. 7.

The actions described in this handoff algorithm to add, delete or replace a sector occur as soft handoffs in this example, unless the hard handoff threshold is exceeded in which case hard handoff takes precedence. However, according to exemplary embodiments of the present invention, additional control mechanisms are established to determine whether a soft or hard handoff is appropriate. More specifically, the present invention adopts an overlay mechanism referred to herein as a "softzone". The softzone is a group of cells, base stations or other transmission sources (e.g., sectors, beams, etc.) which can be identified by, for example, a softzone identification number (softzone id). Soft handoffs are then permitted only between members within the group having the same softzone id. The active set has a softzone identity which is referred to herein as the "active softzone identity". The softzone ids will be distributed from the network to the mobile station on either common or dedicated channels. Thus, the handoff rules described above with respect to FIG. 7 are modified according to this exemplary embodiment such that:

1. When the quality of a measured cell (base station, transmission source, beam, sector, etc.) exceeds the value $Q_{best}$–add__th (the addition threshold), and the measured cell has a softzone identity which is identical to the active softzone identity, then the cell will be added to the active set in a soft handoff action. If the measured cell has a different softzone identity than the active set cells, the measured cell will not be added to the active set, even though the quality of the measured cell exceeds $Q_{best}$–add__th.

2. When the quality of a measured cell (base station, transmission source, beam, sector, etc.) drops below the value of $Q_{best}$–delete__th (the deletion threshold), and the measured cell belongs to the current active set, then the cell will be deleted from the current active set as part of a soft handoff operation.

3. When the quality of a measured cell (base station, transmission source, beam, sector, etc.) exceeds the value of $Q_{best}$+hho__th (the hard handover threshold), and the measured cell does not have a softzone identity which is identical to the active softzone identity, then a hard handoff will be performed to the measured cell. If the measured cell has the same softzone identity as the active set cells, no handoff action will be taken.

4. When the quality of a measured cell (base station, transmission source, beam, sector, etc.) exceeds the value of $Q_{worst}$+rpl__th (the replacement threshold), and the measured cell has a softzone identity which is identical to the active softzone identity, then the measured cell will replace the active set cell with the worst quality.

Of course, the softzone identities must be known in the mobile station (in the case of MEHO) or in the network (in the case of NEHO). Thus, in the former case, the softzone identities will be transmitted to the mobile station beforehand. The values of the various handoff thresholds described herein may be fixed or may be variable with respect to, for example, the quality level of the best cell (base station, transmission sourc:e, beam, sector, etc.) in the active set. For more information on an exemplary implementation of adaptive handoff thresholds, the interested reader is directed to U.S. patent application No. 09/461,029, filed Dec. 15, 1999, entitled "METHODS AND SYSTEMS FOR DYNAMIC THRESHOLD ADJUSTMENT FOR HANDOFFS IN RADIO COMMUNICATION SYSTEMS" to Ulrich Jetzek, the disclosure of which is expressly incorporated here by reference.

Figure 8:
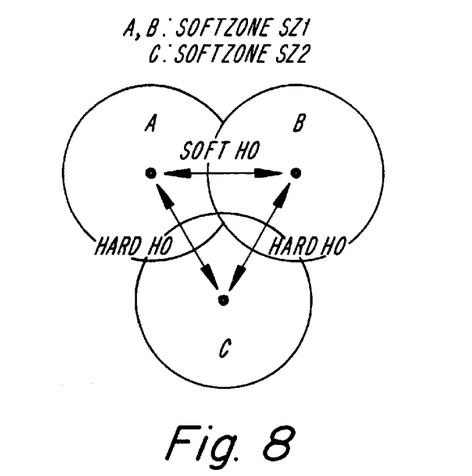
FIG. 8 shows three cells grouped into two softzones used to describe exemplary embodiments of the present invention.
Figure 9:
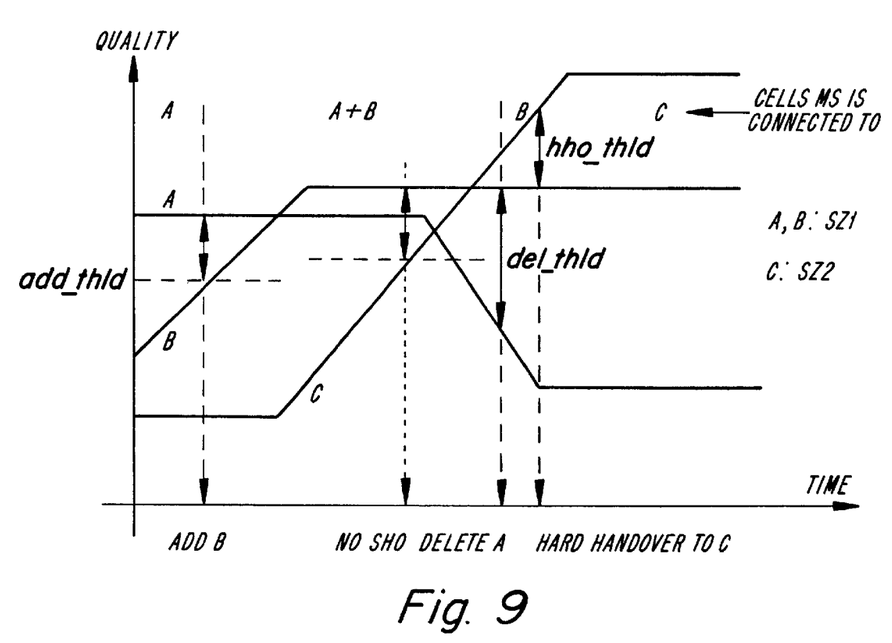
FIG. 9 is a graph of measured quality versus time used to explain handoff techniques according to exemplary embodiments of the present invention.

An illustrative example is provided in FIGS. 8 and 9 to further explain softzone handoff concepts according to exemplary embodiments of the present invention. In FIG. 8, three cells (A, B and C) are depicted that belong to two different softzones SZ1 and SZ2 and, therefore have different softzone ids. Initially, for this example, assume that a mobile station (not shown in FIG. 8) is only connected to cell A. When the quality of cell B satisfies the condition to add a cell, i.e., at time instant "add B" in FIG. 9, a connection to cell B is added, since cells A and B both belong to softzone SZ1. Although the quality of cell C exceeds the addition threshold as well, i.e., at time instant "no SHO" in FIG. 9, cell C is not added by way of soft handoff since cell C has a different softzone identity than the current members of the active set A and B.

After cell A has been deleted from the active set, i.e., at time instant "delete A" in FIG. 9, the quality of cell C exceeds the hard handoff threshold. Thus a hard handoff will be performed that removes cell B from the active set and adds cell C thereto at time instant "hard handover to C" in FIG. 9, since cell C belongs to softzone SZ2, while cell B belongs to softzone SZ1. Of course, if cells B and C had belonged to the same softzone, then no action would have been taken at time instant "hard handover to C" in FIG. 9 because in this case cell c would have been added to the active set at time instant "no sho".

Softzone handoff mechanisms according to the present invention provide a number of benefits. For example, the overhead signalling between the mobile station and the network associated with controlling handoff type selection will be reduced as compared, for example, to the techniques described in EP 817 517 A1. This is due to the fact that cells/sectors are grouped into different softzones instead of treating each cell/sector separately for the purpose of determining which type of handoff, if any, is appropriate. Moreover, these techniques provide a onestep procedure which permits great flexibility in the number of different handoff types that can be used.

Cell planners can use the softzone concepts described herein as a tool to take into account that between certain cells hard handoff might be more reasonable while between other cells a soft handover might be most suitable. In rural areas, for example, line of sight links between mobile stations and base stations are rather frequent. Typically, even in case of hard handoff, a reliable handoff will be performed. On the other hand, in urban areas, line of sight links are rather rare. Furthermore, connection quality may be poor due to shadowing effects. For these reasons, a call is likely to get dropped during a hard handoff, thus creating a preference for soft handoff under these circumstances. In such a scenario, one softzone identity could be assigned to several adjacent urban cells while several different softzone identities could be assigned to rural cells.

Moreover, the grouping of transmission sources into particular softzones need not be static, e.g., a network operator may adjust softzone assignments based on changes to system structure (e.g., cell addition or cell splitting), changing load conditions, etc. Softzones can also be automatically regrouped by way of a dynamic regrouping algorithm, e.g., based on current network resources, air interface resources and loading patterns.

Further, it is anticipated that system capacity will most likely be increased by implementation of the present invention, since the present invention offers the possibility to control soft and hard handoff whereby efficient use of system resources is promoted.

The above-described exemplary embodiments are intended to be illustrative in all respects, rather than restrictive, of the present invention. For example, although the preceding exemplary embodiments do not reference multiple frequency bands, it will be apparent to those skilled in the art that the present invention is applicable to systems employing multiple frequency bands for communication and, therefore, to either intrafrequency or interfrequency band handoff. Moreover, the same or different softzone ids may be provided for different frequency bands used by the same base station to provide communication services. Of course, for mobile stations having only a single receiver, i.e., which can only tune to a single frequency band at a given time, it would then be preferable to provide different softzone ids to different frequency bands employed by a particular base station, i.e., to force hard handoffs rather than soft handoffs therebetween.

Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for controlling handoff of a mobile station to a target transmission source in a radiocommunication system comprising the steps of:

grouping a number of transmission sources of said system into at least two groups;

assigning a group identification to each of said groups;

assigning, to an active set associated with said mobile station, at least one transmission source from one of said groups;

selecting a first type of handoff to occur to at least one target transmission source if said at least one target transmission source is within a group having the same group identification as said at least one transmission source in said active set; and selecting a second type of handoff to occur to said at least one target transmission source if said at least one target transmission source is not within a group having the same group identification as said at least one transmission source in said active set.

2. The method of claim 1, wherein said first type of handoff is soft handoff wherein said at least one transmission source of said active set and said at least one target transmission source transmit substantially the same information to said mobile station at substantially the same time.

3. The method of claim 1, wherein said second type of handoff is hard handoff wherein said mobile station ceases receiving transmissions from said at least one transmission source prior to receiving transmissions from said at least one target transmission source.

4. The method of claim 1, wherein said transmission sources include at least one of: a cell, a base station, a frequency band, a beam associated with an antenna array and a sector.

5. The method of claim 1, further comprising the step of:

adjusting membership of transmission sources of at least one of said groups.

6. The method according to claim 5, wherein adjusting membership of at least one of the transmission sources of at least one of said groups is performed in response to at least one change in the system.

7. The method according to claim 5, wherein adjusting membership of at least one of the transmission sources of at least one of said groups comprises regrouping the membership is by way of a dynamic regrouping algorithm.

8. The method of claim 1, wherein said transmission sources include base stations, and wherein at least one of said base stations supports communication on at least two different frequency bands, and wherein said step of grouping further comprises: grouping a first frequency band associated with said at least one of said base stations in one of said groups.

9. The method of claim 1, wherein said step of selecting the first type of handoff further comprises the steps of:

measuring a quality level associated with transmission sources in at least one of said groups;

evaluating said measured quality levels in conjunction with at least one threshold; and adjusting membership in said active set based on a result of said evaluating step.

10. The method of claim 9, wherein said at least one threshold is variable.

11. The method of claim 10, wherein said at least one threshold varies as a function of a quality level associated with a member of said active set.

12. The method of claim 9, wherein said quality level is one of downlink signal-to-interference ratio, downlink received signal strength, downlink pathloss and downlink pathloss plus uplink interference.

13. The method of claim 1 further comprising the step of:

distributing group identifiers of transmission sources to said mobile station.

14. The method according to claim 1, wherein at least one transmission source is assigned to different groups.

15. The method according to claim 1, wherein membership of at least one of the transmission sources in the at least one of the at least two groups is based on a current condition of the radiocommunication system.

16. A controller for controlling handoff of a mobile station to a target transmission source in a radiocommunication system capable of performing both soft and hard handoffs, comprising:

a processor for:

(a) selecting a soft handoff of a connection from at least one first transmission source of said system, said at least one first transmission source having a first group identification assigned thereto, to at least one second transmission source of said system, said at least one second transmission source having a second group identification assigned thereto, when said first and second group identifications are the same; and (b) selecting a hard handoff of said connection from said at least one first transmission source of said system to said at least one second transmission source of said system when said first and second group identifications are different.

17. The controller of claim 16, wherein said at least one first and said at least one second transmission sources are transceivers disposed within a same base station but which support communications on different frequency bands.

18. The controller of claim 17, wherein said first and second group identifications are different.

19. The controller of claim 16, wherein said at least one first transmission source includes one or more beams of an antenna array.

20. The controller of claim 16, wherein said at least one first transmission source includes one or more sectors associated with one or more base stations.

21. The controller of claim 16, wherein said processor can reassign said at least one first transmission source from said first group identification to another group identification.

22. The controller of claim 16, further comprising:

at least one third transmission source which is assigned to both said first and second groups.

23. The controller of claim 16, wherein said controller is disposed in a mobile station.

24. The controller of claim 16, wherein said controller is disposed in a switch.

25. The controller according to claim 16, wherein said at least one first and second transmission sources include base stations, and wherein at least one of said base stations supports communication on at least two different frequency bands, and wherein at least one of the assigned group identifications are associated with a group, said group comprising:

a first frequency band associated with said at least one of said base stations.

26. The controller according to claim 16, wherein said processor includes selecting means for said selecting a soft handoff, said selecting means comprising:

means for measuring a quality level associated with transmission sources associated with at least one of said assigned group identifications;

means for evaluating said measured quality levels in conjunction with at least one threshold; and means for adjusting membership in an active set associated with the mobile station based on a result of said evaluating step.

27. The controller according to claim 26, wherein said quality level is one of downlink signal-to-interference ratio, downlink received signal strength, downlink pathloss and downlink pathloss plus uplink interference.

28. The controller according to claim 27, wherein said at least one threshold varies as a function of a quality level associated with a member of said active set.

29. The controller according to claim 26, wherein said at least one threshold is variable.

30. The controller according to claim 29, wherein said at least one threshold varies as a function of a quality level associated with a member of said active set.

31. The controller according to claim 29, wherein said quality level is one of downlink signal-to-interference ratio, downlink received signal strength, downlink pathloss and downlink pathloss plus uplink interference.

32. The controller according to claim 31, wherein said at least one threshold varies as a function of a quality level associated with a member of said active set.

33. The controller according to claim 16, wherein the controller is capable of distributing group identifiers of transmission sources to said mobile station.

34. The controller according to claim 16, wherein the processor comprises means for assigning at least the first transmission source with the first group identification and at least the second transmission source with the second group identification, which assigning corresponds to a change in the radiocommunication system.

35. The controller according to claim 16, wherein the processor comprises means for assigning at least the first transmission source with the first group identification and at least the second transmission source with the second group identification, and wherein at least one of the first transmission source and the second transmission source is assigned by way of an algorithm for dynamically regrouping transmission sources in the radiocommunication system.

36. A radiocommunication system comprising:

at least one first transmission source, having a first group identification assigned thereto and supporting a connection with a mobile station;

at least one second transmission source, having a second group identification assigned thereto;

a network controller for controlling operations of said at least one first and said at least one second transmission sources; and a processor, associated with one of said network controller and said mobile station for:

(a) selecting a soft handoff of said connection from said at least one first transmission source to said at least one second transmission source when said first and second group identifications are the same; and (b) selecting a hard handoff of said connection from said at least one first transmission source to said at least one second transmission source when said first and second group identifications are different.

37. The radiocommunication system according to claim 36, wherein the processor comprises means for assigning at least the first transmission source with the first group identification and at least the second transmission source with the second group identification, which assigning is based on a change in the radiocommunication system.

38. The radiocommunication system according to claim 36, wherein the processor comprises means for assigning at least the first transmission source with the first group identification and at least the second transmission source with the second group identification, which means for assigning includes an algorithm for dynamically regrouping transmission sources in the radiocommunication system.

* * * * *